United States Patent
Preguica

(10) Patent No.: US 7,602,738 B2
(45) Date of Patent: Oct. 13, 2009

(54) PROCESS FOR GENERATING AND UPDATING A HIERARCHICAL TREE IN A MANET MULTICAST ROUTING PROTOCOL AD HOC NETWORK

(75) Inventor: Christophe Preguica, Massy (FR)

(73) Assignee: ALCATEL, Paris (FR)

( * ) Notice: Subject to any disclaimer, the term of this patent is extended or adjusted under 35 U.S.C. 154(b) by 662 days.

(21) Appl. No.: 11/126,293

(22) Filed: May 11, 2005

(65) Prior Publication Data
US 2005/0259595 A1    Nov. 24, 2005

(30) Foreign Application Priority Data
May 18, 2004    (FR)    ................... 04 50983

(51) Int. Cl.
*H04L 12/28*    (2006.01)
(52) U.S. Cl. ....................................... 370/256
(58) Field of Classification Search .................. None
See application file for complete search history.

(56) References Cited

U.S. PATENT DOCUMENTS

| | | | | |
|---|---|---|---|---|
| 6,252,856 | B1 * | 6/2001 | Zhang | 370/254 |
| 7,327,683 | B2 * | 2/2008 | Ogier et al. | 370/338 |
| 2003/0235175 | A1 * | 12/2003 | Naghian et al. | 370/338 |
| 2004/0018839 | A1 * | 1/2004 | Andric et al. | 455/433 |
| 2004/0213167 | A1 * | 10/2004 | Garcia-Luna-Aceves et al. | 370/254 |

FOREIGN PATENT DOCUMENTS

WO    WO 02/23832 A    3/2002

OTHER PUBLICATIONS

Royer, E.M. Et Al: "Multicast Operation of the Ad-Hoc On-Demand Distance Vector Routingprotocol." Mobicom '99. Proceddings of the 5$^{th}$ Annual ACM/IEEE International Conference on Mobile Computing and Networking. Seattle, WA, Aug. 15-20, 1999, Annual ACM/IEEE International Conference on mobile Computing and Networking, New York, NY, ACM, US, vol. Conf. 5, Aug. 15, 1999, pp. 207-218, XP000896087.

Devarapalli V. et al: "MZR: a multicast protocol for mobile ad hoc networks" ICC 2001. 2001 IEEE International Conference on Communications, Conference Record. Helsinky, Finland, Jun. 11-14, 2001, IEEE International Conference On Communications, New York, NY: IEEE, US, vol. vol. 1 of 10, Jun. 11, 2001, pp. 886-891, XP010553128.

* cited by examiner

*Primary Examiner*—Raj Jain
(74) *Attorney, Agent, or Firm*—Sughrue Mion, PLLC

(57) ABSTRACT

A MANET multicast proactive routing protocol ad hoc network is designed to implement a process dedicated to the generating and updating of a "child/parent" hierarchical tree. This process consists, if a "child" router (RR1) belonging to the network wishes to join a hierarchical tree associated with a source router (SR), of associating this child router (RR1) with a neighboring "parent" router ($R1_{NA}$) through the transmitting of a join message designating the source router (SR), in unicast mode, to the neighboring parent router ($R1_{NA}$).

11 Claims, 8 Drawing Sheets

PROCESS FOR GENERATING AND UPDATING A HIERARCHICAL TREE IN A MANET MULTICAST ROUTING PROTOCOL AD HOC NETWORK

BACKGROUND OF THE INVENTION

The invention concerns the field of MANET (Mobile Ad hoc Network) routing protocol ad hoc networks, and more specifically the generating of hierarchical trees within such networks.

As experts know, point-to-multipoint (or multicast) routing protocols were initially designed for wireline networks and are therefore poorly suited (or even completely unsuited) to ad hoc networks.

To allow the use of multicast routing in ad hoc networks, several protocols were therefore proposed. These protocols use either mesh-based routing or tree-based routing.

Mesh-based multicast routing consists of defining several paths between each source router of a network and the receiving routers. This routing method is relatively well suited to the mobility of network devices as it allows the transmitting of data packets if a link between two routers is interrupted. It offers the advantage of requiring few control packet exchanges to generate and update the mesh. However, it does not optimize the use of the bandwidth within the network and does not facilitate increases in the network's load.

Tree-based multicast routing consists of defining a single optimum routing path between a source router and receiving routers. It is based on the generating and updating of trees by means of mechanisms (or processes) such as AMRIS, MAODV, LAM and LGT.

A MANET routing protocol may be reactive (in other words, the router must request a path when necessary as it doesn't know the network's topology) or proactive (each router may calculate a path when necessary as it knows the network's topology).

AMRIS (Ad hoc Multicast Routing protocol utilizing Increased ID numberS) is a process requiring a large number of control packets to generate and update trees and as such is not suited to the mobility of network devices. Indeed, significant time is required to reconstruct a tree when routers move. Furthermore, during the tree reconstruction phase the data packets are lost.

MAODV (Multicast Ad hoc On-Demand Distance Vector) is, for example, described in the article "*Multicast Operation of the Ad-hoc On-Demand Distance Vector Routing Protocol*" by Elizabeth M. Royer and Charles E. Perkins, published on 15 Aug. 1999, in Mobicom'99, Proceedings of the 5th annual ACM/IEEE International Conference on Mobile Computing and Networking. It is a process mainly intended to operate with the AODV protocol, which is a reactive MANET protocol. It uses the broadcasting of control packets to signal each movement of a router, which overloads the ad hoc network.

SUMMARY OF THE INVENTION

LAM (Lightweight Adaptive Multicast) is a process that generates shared multicast trees, which provides paths that aren't as optimized as in the case of a traditional multicast tree. In addition, like AMRIS it requires a large number of control packets to generate and update trees.

LGT (Location Guided Tree) is a process using an overlaying multicast distribution tree placed on top of an underlying point-to-point (or unicast) routing protocol. The multicast data are therefore encapsulated in unicast packets, which is particularly costly in terms of bandwidth.

As no tree generation process is entirely satisfactory in ad hoc networks, the invention's aim is to improve the situation.

To this end, it proposes a process dedicated to the generating and updating of a "child/parent" hierarchical tree in a MANET multicast proactive routing protocol ad hoc network, consisting, if one of the network's "child" routers wishes to join a hierarchical tree associated with a source router, of associating this child router with a neighboring "parent" router (within the network) by transmitting to the neighboring parent router, in unicast mode, a join message designating the source router.

When the neighboring parent router receives the join message, two situations may arise:

a) Either it is already associated with one of the network's other child routers, in which case it is associated with the requesting child router in order to join it to the pre-existing tree and the value of its state information representative of the number of child routers associated with it is incremented by one unit, b) Or it is not yet associated with one of the network's child routers, in which case it is associated with the requesting child router and its state information is given a value of "one"; a join message designating the source router is then transmitted in unicast mode to one of the network's other neighboring routers, c) Either operation a) or operation b) is then repeated with the neighboring parent router receiving a join message according to whether or not it is already associated with one of the network's other child routers.

According to another aspect of the invention, if a router no longer wishes to belong to a tree, as it is no longer associated with a child router, this router may transmit a prune message to its neighboring parent router in unicast mode.

When the neighboring parent router receives the prune message, two situations may arise:

i. Either it is associated with at least two of the network's child routers, in which case the requesting router is disassociated from the neighboring parent router so that it no longer belongs to the tree and the value of its state information representative of the number of child routers associated with it is decremented by one unit, ii. Or it is only associated with the requesting child router, in which case it is disassociated from the requesting child router and its state information is given the value "zero"; a tree pruning message is then transmitted to its own neighboring parent router in unicast mode, iii. Operation i) or operation ii) is then repeated with the neighboring parent router receiving a prune message according to whether or not it is associated with at least two child routers or with a single child router.

According to another aspect of the invention, when a link embodying an association between a parent router and a child router is interrupted, the child router may transmit a join message (designating the source router), in unicast mode, to one of the network's other neighboring routers, in order to be associated with it. This neighboring router then becomes a new neighboring parent router for the child router.

When the new neighboring parent router receives the prune message, two situations may arise:

I) Either it is already associated with one of the network's other child routers, in which case it is associated with the requesting child router in order to join it to the pre-existing tree and the value of its state information representative of the number of child routers associated with it is incremented by one unit, II) Or it is not yet associated with one of the network's child routers, in which case it is associated with the requesting child router and its state information is given the value "one"; a join message designating the source router is then transmitted, in unicast mode, to one of the network's other neighboring routers, which becomes its parent, III) Operation I) or operation II) is then repeated with the neighboring parent router receiving a join message according to whether or not it is already associated with one of the network's other child routers.

For example, if the link embodying an association between a parent router and a child router is interrupted, the parent router may transmit a tree pruning request, in unicast mode, to its neighboring parent router. In this case, it is also advantageous to count, at parent router level, the time that elapses from the start of a link interruption, so that the prune message is only transmitted if a first chosen duration has elapsed.

According to another aspect of the invention, at the level of each router belonging to a tree the intensity of the signals originating from its parent router and each of its child routers may be analyzed. These intensities may then be compared with a chosen threshold. This means that if a child router detects an intensity below the threshold on the link with its neighboring parent router, it is permitted to transmit a tree joining request to a neighboring router other than its neighboring parent router. In this case, it is also advantageous to count, at child router level, the time elapsed from when the intensity below the threshold was first detected, so that it is only permitted to transmit its join message if a second chosen duration has elapsed.

Furthermore, the join messages and/or the prune messages each preferably include a unicast address designating the source router and a multicast group address.

The invention is particularly well suited, although not exclusively, to networks implementing a MANET multicast proactive routing protocol of the TBRPF (Topology-Based and dissemination with Reverse Path Forwarding ) or OLSR (Optimized Link State Routing) type.

Other aspects and advantages of the invention will appear on examination of the detailed description below, and of the figures appended, in which:

The drawings appended may not only complete the invention, but also contribute to its definition, where applicable.

DETAILED DESCRIPTION OF EXEMPLARY EMBODIMENTS OF THE INVENTION

The invention's objective is to allow the generating and updating of a "child/parent" hierarchical tree in a MANET multicast proactive routing protocol ad hoc network.

In the following, by way of an illustrative example, the ad hoc network is assumed to use a multicast proactive routing protocol, such as TBRPF (Topology-Based and dissemination with Reverse Path Forwarding) or OLSR (Optimized Link State Routing). However, the invention is not limited to these multicast proactive routing protocol examples.

Figure 1A:
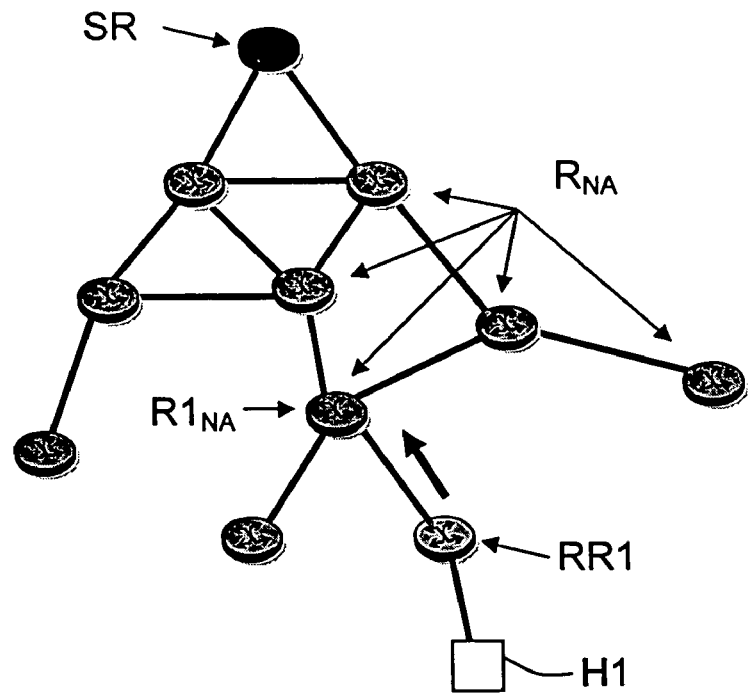
FIGS. 1A and 1E schematically illustrate the five successive phases that make up a hierarchical tree example according to the invention, between a first receiving router and a source, FIGS. 2A and 2B schematically illustrate the two successive phases allowing a second receiving router to join the hierarchical tree example in FIG. 1E, FIGS. 3A to 3F schematically illustrate the six successive phases allowing the destroying of the hierarchical tree example in FIG. 2B, and FIGS. 4A and 4B schematically illustrate the two successive phases allowing the re-establishing, according to the invention, of a hierarchical tree if a link is interrupted in the hierarchical tree example in FIG. 1E.

As is schematically illustrated in FIG. 1A, a multicast ad hoc network may be assimilated into at least one group G of routers comprising a source router SR and routers $R_{NA}$ which, as long as a hierarchical tree has not been initiated, are not linked two by two in a "parent/child" hierarchy. Potential links between routers that do not belong to a hierarchical tree are marked in the figures by single, broad black lines.

Of these routers $R_{NA}$, some may be momentarily connected to a host network device H, belonging, for example, to a client subscribed to the ad hoc network. These routers, known as receiving routers RR, are usually the furthest away from the source router SR in terms of hierarchy. The other routers are usually located between the receiving routers RR and the source router SR in term of hierarchy.

For a host H to be able to exchange data with the source router SR, of the group G to which it belongs, an optimum routing path must be defined between said source router SR and the receiving router RR1 with which it is connected.

In a multicast proactive routing protocol network, each router knows the network's topology, which means it is able to determine the shortest routing path (or optimum path) for transmitting data to the source router SR. Consequently, each router is able to determine the neighboring router that is above it in the hierarchy and to which it must transmit the data received with a view to their routing to the source router SR. The router that is the least well placed of the two hierarchically is known as the child router, while its neighboring router is known as the (neighboring) parent router.

The process according to the invention is in particular intended to allow the generating of a hierarchical tree within an ad hoc network.

More specifically, the process consists, if a child router (for example RR1) belonging to a group G wishes to join a hierarchical tree associated with a source router SR of this group G, of associating it with a neighboring parent router (here $R1_{NA}$) by transmitting a join message to the latter, in unicast mode, marked in FIG. 1A by a thick arrow, designating the source router SR.

Each join message preferably includes the unicast address designating the source router SR and the multicast address of the group G.

When the parent router $R1_{NA}$ receives the join message transmitted by the child router RR1, two situations may arise.

If the parent router is already associated with another child router of the group G it means that a tree already exists and the parent router belongs to it (in this case it is known as $R_A$). For example, each router $R_A$ belonging to a tree of the group G is associated with a state defined by a triplet comprising the unicast address S designating the source router SR, the multicast address of the group G and state information whose value represents the number of child routers associated with it. In this first case, the parent router ($R1_{NA}$) is associated with the requesting child router (RR1) in order to join it to the pre-existing tree and the value of its triplet's state information is incremented by one unit.

Figure 1B:
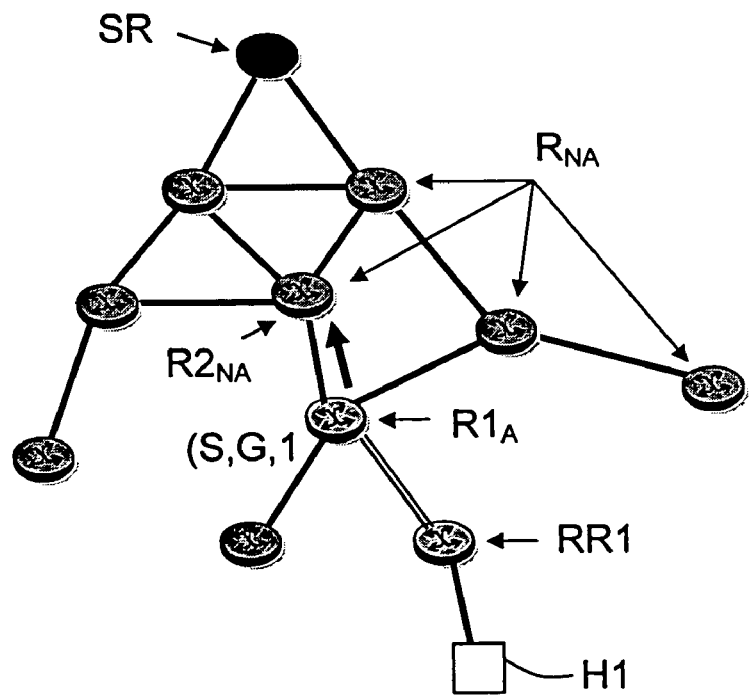

On the other hand, if the parent router ($R1_{NA}$) is not yet associated with a child router of the group G, no state is associated with it. This situation is illustrated in FIG. 1A. In this second case, the parent router ($R1_{NA}$) is associated with the requesting child router (RR1), which is marked in FIG. 1B by a double line, and its triplet is formed from the unicast address S designating the source router SR and the multicast address of the group G, contained in the join message received, and the value of the state information equal to one (1).

As the parent router now has a state, it is considered to belong to the tree under construction and becomes known as $R1_A$. It then transmits a join request designating the source router SR, in unicast mode, to its neighboring parent router $R2_{NA}$, in order to continue the construction of the hierarchical tree towards the source router SR. This transmission is marked in FIG. 1B by a thick arrow.

When the parent router $R2_{NA}$ receives the join message transmitted by the parent router $R1_A$, one of the two situations referred to above may once again arise.

If it is already associated with another child router of the group G, it is associated with the requesting child router $R1_A$, in order to join it to the pre-existing tree, and the value of its triplet's state information is incremented by one unit.

Figure 1C:
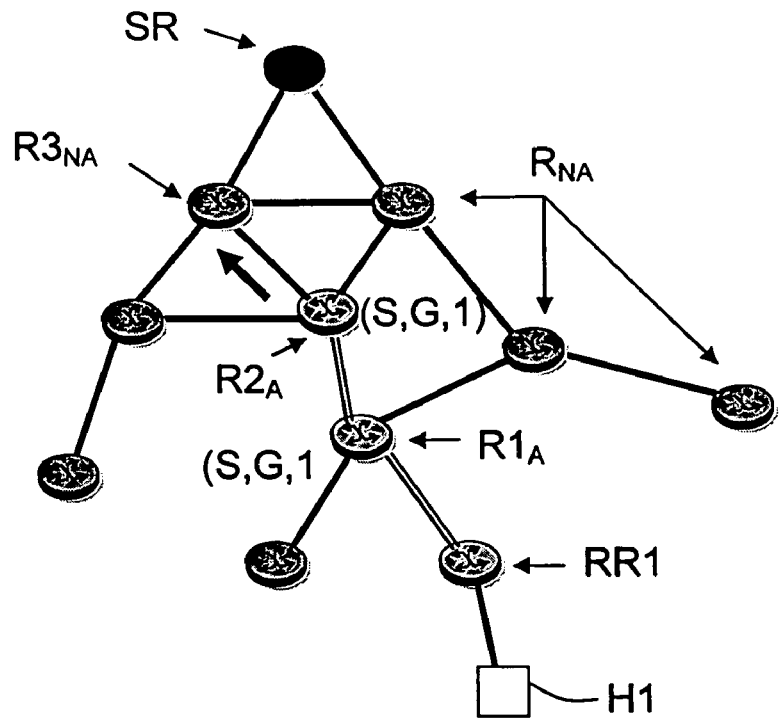

On the other hand, if it is not yet associated with a child router of the group G, it is associated with the requesting child router $R1_A$, which is marked in FIG. 1C by a double line, and its triplet is formed from the unicast address S designating the source router SR and the multicast address of the group G, contained in the join message received, and the value of the state information equal to one (1). As the parent router now has a state, it is considered to belong to the tree under construction and is now known as $R2_A$. It then transmits a join message designating the source router SR, in unicast mode, to its neighboring parent router $R3_{NA}$, in order to continue the construction of the hierarchical tree. This transmission is marked in FIG. 1C by a thick arrow.

Figure 1D:
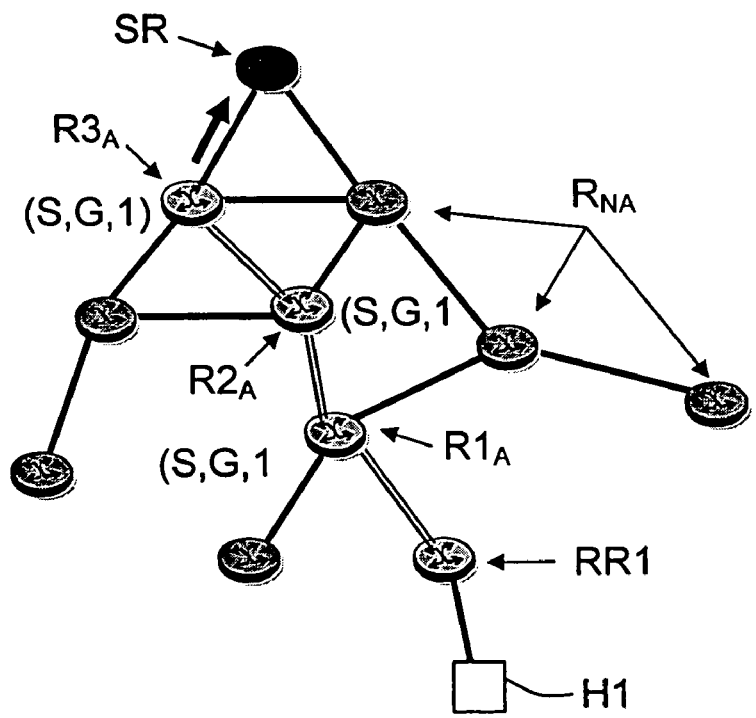

This tree generating mechanism continues until the source router SR is reached. This is the case in particular in the example illustrated. Indeed, in this example the neighboring parent router $R3_{NA}$ is not yet associated with a child router of the group G. Consequently, it is associated with the requesting child router $R2_A$, which is marked in FIG. 1D by a double line, and its triplet is formed from the unicast address S designating the source router SR and the multicast address of the group G, contained in the join message received, and the value of the state information equal to one (1). As the parent router now has a state, it is considered to belong to the tree under construction and is now known as $R3_A$. It then transmits a join request, in unicast mode, to its neighboring parent router, which here is the source router SR. The join request designates the source router in order to complete the construction of the hierarchical tree. This transmission is marked in FIG. 1D by a thick arrow.

Figure 1E:
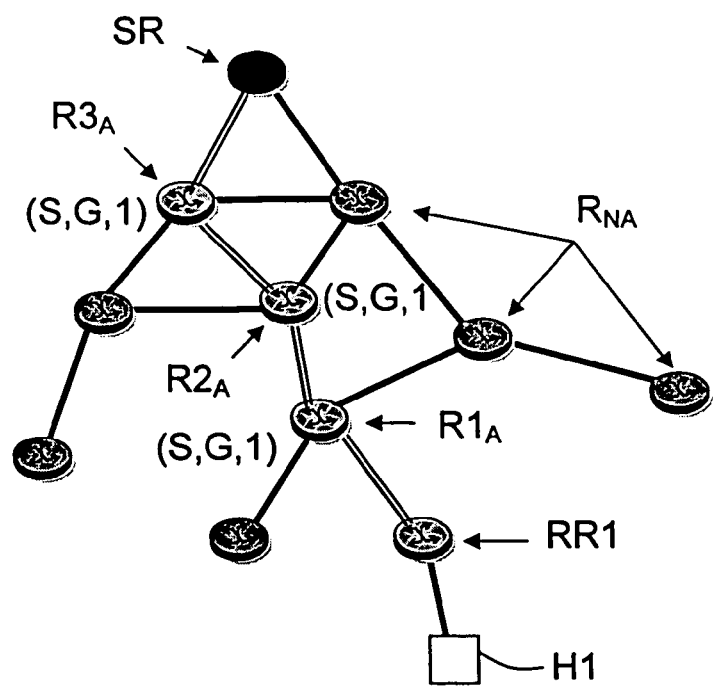

If the source router SR receives from the router $R3_A$ (which then becomes its child) the join message that designates it, they are associated with each other, which is marked in FIG. 1E by a double line. The hierarchical tree is then established between the receiving router RR1 and the source router SR.

Figure 2A:
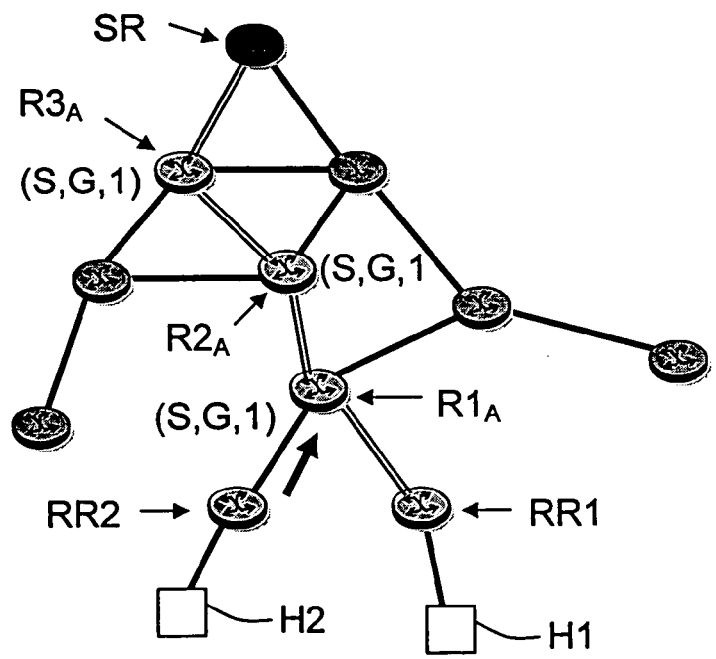
Figure 2B:
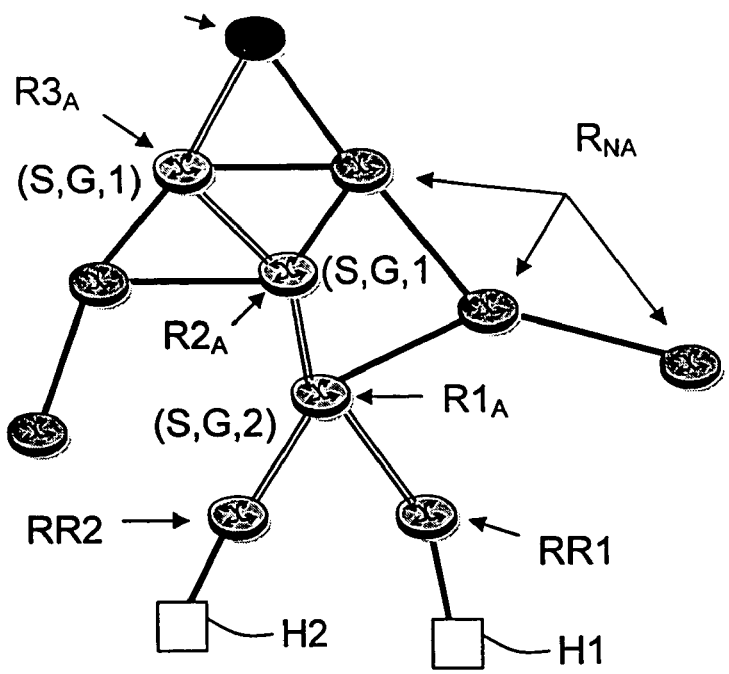

As illustrated in FIGS. 2A and 2B, other receiving routers RR may join the hierarchical tree established.

More specifically, in the example illustrated in FIG. 2A, a second receiving router RR2, belonging to the group G, has received from a second host H2, to which it is connected, a request to receive the traffic originating from the source router SR. As this second receiving router RR2 is not attached here to a hierarchical tree of the group G, it transmits a join message, in unicast mode, to its neighboring parent router, which here is the router $1_A$. This transmission is marked in FIG. 2A by a thick arrow.

As the router $R1_A$ is already associated with the child router RR1 of the group G, it is also associated with the requesting child router RR2, in order to join it to the pre-existing tree, which is marked in FIG. 2B by a double line, and the value of its triplet's state information is incremented by one unit, making it equal to two (2). The hierarchical tree is thus increased.

The process according to the invention also allows the destruction of a hierarchical tree.

More specifically, if a router no longer needs to belong to a tree, as it is no longer associated with a child router, this router may transmit a prune message to its neighboring parent router in unicast mode.

Each prune message preferably includes the unicast address designating the source router SR and the multicast address of the group G.

The destruction of a tree will now be described in detail by means of an example illustrated in FIGS. 3A to 3F. This example is based on the hierarchical tree illustrated in FIG. 2B.

Figure 3A:
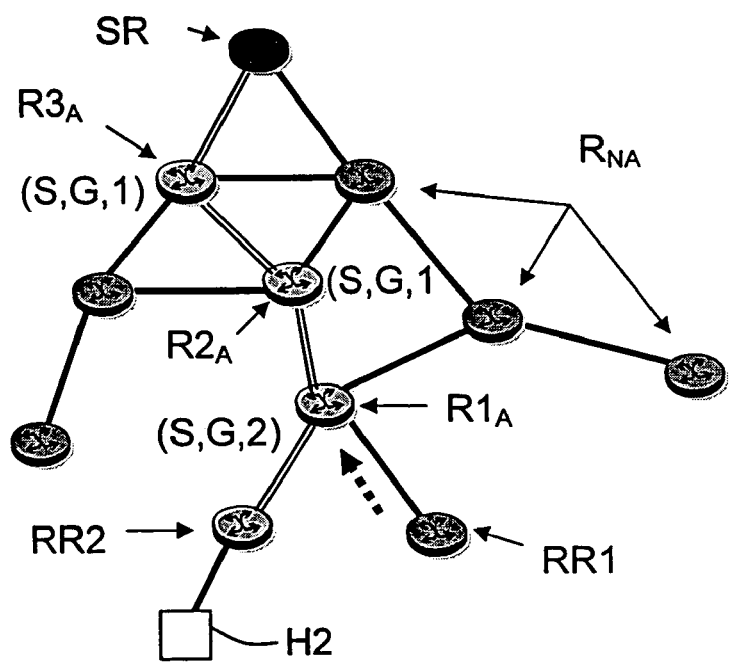

When the parent router, here $R1_A$, receives the prune message transmitted by its child router, here RR1, marked in FIG. 3A by a thick dotted arrow, two situations may arise.

If the parent router $R1_A$ is associated with at least two child routers of the group G, as illustrated in FIG. 3A, it is disassociated from the requesting receiving router RR1, so that the latter no belongs to the tree, and the value of its state information representative of the number of child routers associated with it is decremented by one unit. In this example, the value of its state information therefore becomes equal to one (1).

If the parent router $R1_A$ is only associated with the requesting child receiving router RR1, it is disassociated from the latter and its state information is given the value "zero" (value previously equal to one). Then, given that the parent router $R1_A$ is no longer associated with a child router (indeed it no longer has a state (or triplet)), a request for pruning from the tree is transmitted in unicast mode to its own neighboring parent router $R2_A$. The parent router $R1_A$ then once more becomes the router $R1_{NA}$. The transmitting of the prune message is marked in FIG. 3B by a thick dotted arrow.

If the neighboring parent router $R2_A$ receives the join message transmitted by its child router $R1_{NA}$, the two situations referred to above may once again arise.

If it is associated with at least two routers of the group G, it is disassociated from the requesting child router $R1_{NA}$, so that it no longer belongs to the tree, and the value of its triplet's state information decrements by one unit.

On the other hand, if it is only associated with the child router $R1_{NA}$ of the group G, it is disassociated from the latter, and the value of its triplet's state information is decremented by one unit, making it equal to zero (0). Then, given that the parent router $R2_A$ is no longer associated with a child router (indeed it no longer has a state (or triplet)), a request for pruning from the tree is transmitted in unicast mode to its own neighboring parent router $R3_A$. The parent router $R2_A$ then once more becomes the router $R2_{NA}$.

The two situations then present themselves once more at the level of parent router $N3_A$. The process thus continues, possibly as far as the source router SR, therefore completely destroying the hierarchical tree previously created, or the process is interrupted leaving a "reduced" hierarchical tree.

Figure 3B:
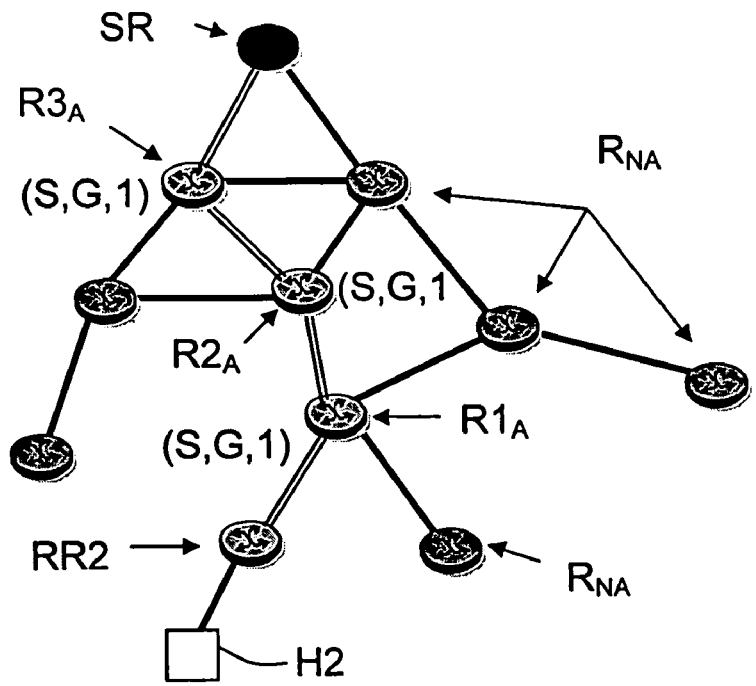

In the example illustrated in FIG. 3B, the parent router $R1_A$ still has a state after being disassociated from its child receiving router RR1. As it is still associated with a child router (RR2), it therefore does not need to transmit a prune message to its parent router $R2_A$.

Figure 3C:
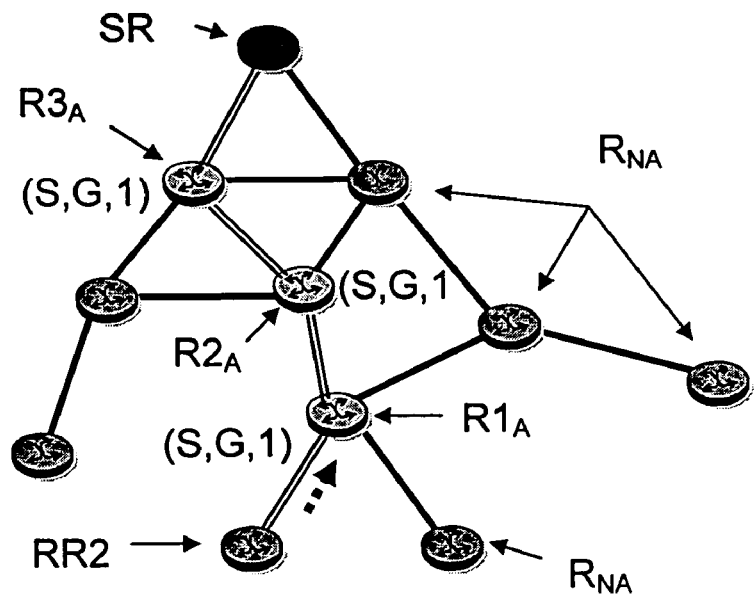
Figure 3D:
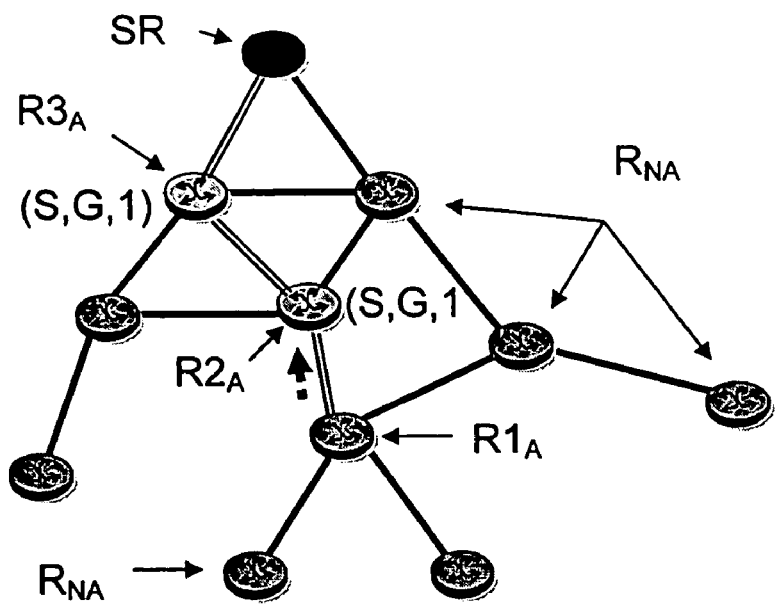
Figure 3E:
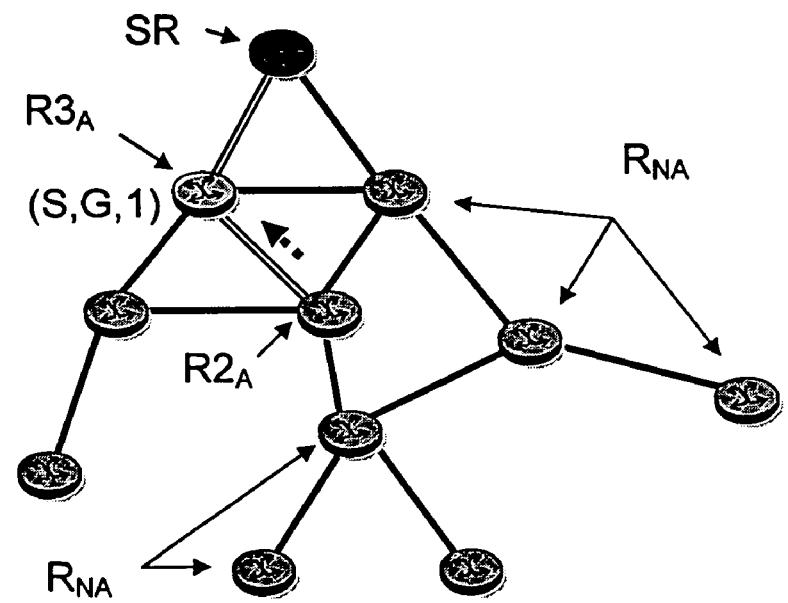
Figure 3F:
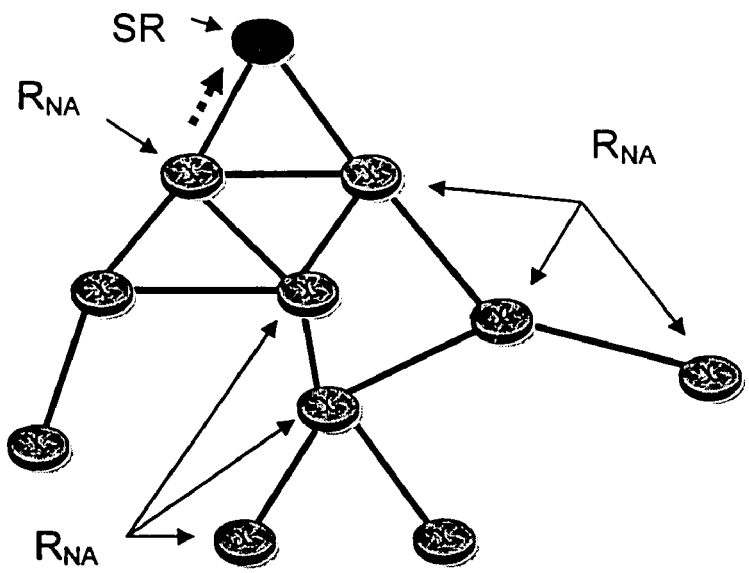

As illustrated in FIG. 3C, the destruction of the tree may actually be initiated when the parent router $R1_A$ receives a prune message transmitted by its last child router, here RR2, marked by a thick dotted arrow.

In this example, the parent router $R1_A$ is disassociated from its child receiving router RR2 and the value of its state information is given as "zero" (0) (value previously equal to one). Then, given that the parent router $R1_A$ is no longer associated with a child router (indeed it no longer has a state (or triplet)), a request for pruning from the tree is transmitted in unicast mode to its own neighboring parent router $R2_A$. The parent router $R1_A$ then once more becomes the router $R1_{NA}$. The transmitting of the prune message is marked in FIG. 3D by a thick dotted arrow.

Given that the parent router $R2_A$ is (here) no longer associated with a child router (indeed it no longer has a state (or triplet)), a request for pruning from the tree is transmitted in unicast mode to its own neighboring parent router $R3_A$. The parent router $R2_A$ then once more becomes the router $R2_{NA}$. The transmitting of the prune message is marked in FIG. 3E by a thick dotted arrow.

The parent router $R3_A$ is then disassociated from its child router $R2_{NA}$ and the value of its state information is given as "zero" (0) (value previously equal to one). Then, given that the parent router $R3_A$ is no longer associated with a child router (indeed it no longer has a state (or triplet)), a request for pruning from the tree is transmitted in unicast mode to its own neighboring parent router, which here is the source router SR. The parent router $R3_A$ then once more becomes the router $R3_{NA}$. The transmitting of the prune message is marked in FIG. 3F by a thick dotted arrow.

As the source router SR is no longer associated with a child router, the hierarchical tree no longer exists.

The process according to the invention also allows the reforming of a hierarchical tree if at least one of the links established between two routers is interrupted. This in fact involves preserving the "lower" part of a hierarchical tree, containing one or several receiving routers RR, and linking it to an "upper" part that is at least partially new, containing the source router SR.

According to the invention, when a link embodying an association between a parent router and a child router is interrupted, the child router may transmit a join message (designating the source router SR), in unicast mode, to another neighboring router of the group G, in order to be associated with it. This neighboring router then becomes a new neighboring parent router for the child router.

When the new neighboring parent router receives the prune message, two situations may arise.

If it is already associated with another child router of the group G, it is associated with the requesting child router, in order to join it to the pre-existing tree, and the value of its state information (representative of the number of child routers associated with it) is incremented by one unit.

On the other hand, if it is not already associated with another of the network's child routers, it is associated with the requesting child router and its state information is given a value of "one". It then transmits a join message designating the source router, in unicast mode, to another of the network's neighboring routers.

The two situations referred to above then present themselves once more, so that one or the other of the sets of corresponding operations is repeated, according to whether the neighboring parent router receiving a join message is or is not already associated with one of the network's other child routers.

These prune message transmission operations continue until the source router SR is reached. The entire upper part of a tree may thus be recreated. However, it may also be possible that only two links need to be recreated for grafting onto the old upper part, or an end part of it, containing the source router SR.

Figure 4A:
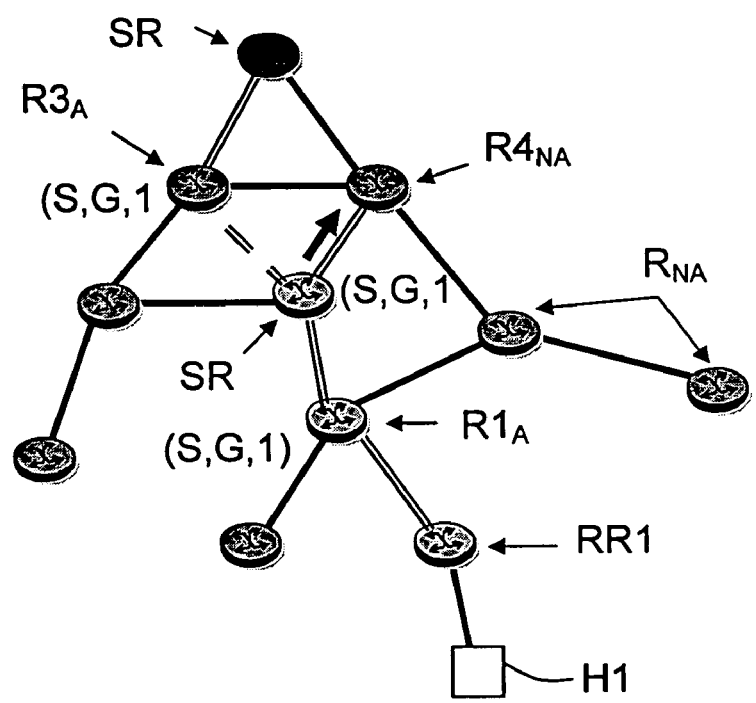

In the example illustrated in FIG. 4A, the tree (initially the same as that illustrated in FIG. 1E) includes an interrupted link between the routers $R2_A$ and $R3_A$.

The child router $R2_A$ must therefore determine a new parent router, here $R4_{NA}$, which is not yet associated with a child router and therefore does have a state (or triplet). The child router $R2_A$ therefore transmits a join message (designating the source router SR) in unicast mode to the neighboring router $R4_{NA}$, in order to be associated with it. This transmission is marked in FIG. 4A by a thick arrow.

When the neighboring parent router $R4_{NA}$ receives the prune message, it is associated with the requesting child router $R3_A$ and the value of its state information is given as one (1). The new parent router $R4_A$ then becomes the router $R4_A$. It then transmits a join message designating the source router SR, in unicast mode, to a neighboring router of the group G (here SR), which then becomes its parent. This transmission is marked in FIG. 4B by a thick arrow. The neighboring parent router, which here is the source router SR, is then associated with the child router $R4_A$.

As the neighboring parent router is here the source router SR, the upper part of the tree has been recreated to reform a hierarchical tree.

As the router $R3_A$ is here ho longer associated with a child router, but is associated with the source router SR by a link constituting the old upper part, which has become redundant, it is preferable to destroy this old upper part of the reformed tree. Of course, such a destruction cannot take place if the parent router is still associated with at least one child router despite the interrupting of the link. However, each time that a router no longer has any children, it must be pruned from the reformed tree by transmitting a prune message to its parent router.

Thus, in the example illustrated, the router $R3_A$ transmits a tree pruning request to the source router SR (its parent). This transmission is marked in FIG. 4B by a dotted arrow.

It is advantageous, however, for the parent router, whose link with its sole child router is interrupted, to wait a few moments before transmitting its tree pruning request to its own parent router. Indeed, the interrupting of a link may be momentary, and for example result from a slight moving of the child or parent router.

In this case, the parent router may launch a programmed timeout for a chosen duration, for example equal to 500 ms, once it detects the interrupting of the link with its child. When the time elapsed is equal to the duration chosen, the parent router transmits its prune message.

The process according to the invention may also allow the implementing of a mechanism for forecasting the interrupting of links between parent and child routers.

Indeed, in some situations, for example if one of the routers belonging to the hierarchical tree moves, the signals that it transmits over one of the hierarchical tree's links arrive with an increasingly low intensity at the neighboring router at the other end of the link. If the intensity of the signals received by one of the two routers falls below a first threshold T1, the link is interrupted. In a traditional network, a renegotiation of the complete hierarchical tree is in this case required.

The forecasting mechanism proposed allows the creating of one or several new links within a hierarchical tree, in a forward-looking way, from the child router concerned (as in the case described above with reference to FIGS. 4A and 4B), so that data packets are not lost when the link is actually interrupted and/or time is not needlessly wasted during the tree reforming phase following the interrupting of a link.

To this end, each router belonging to a hierarchical tree may be charged with analyzing the intensity of the signals originating from each of its parent routers, at least, then comparing these intensities with a second chosen threshold T2. This means that if a child router detects an intensity below the second chosen threshold T2 on the link established with its neighboring parent router, said child router is permitted to transmit a tree joining request to another neighboring router other than its neighboring parent router.

Figure 4B:
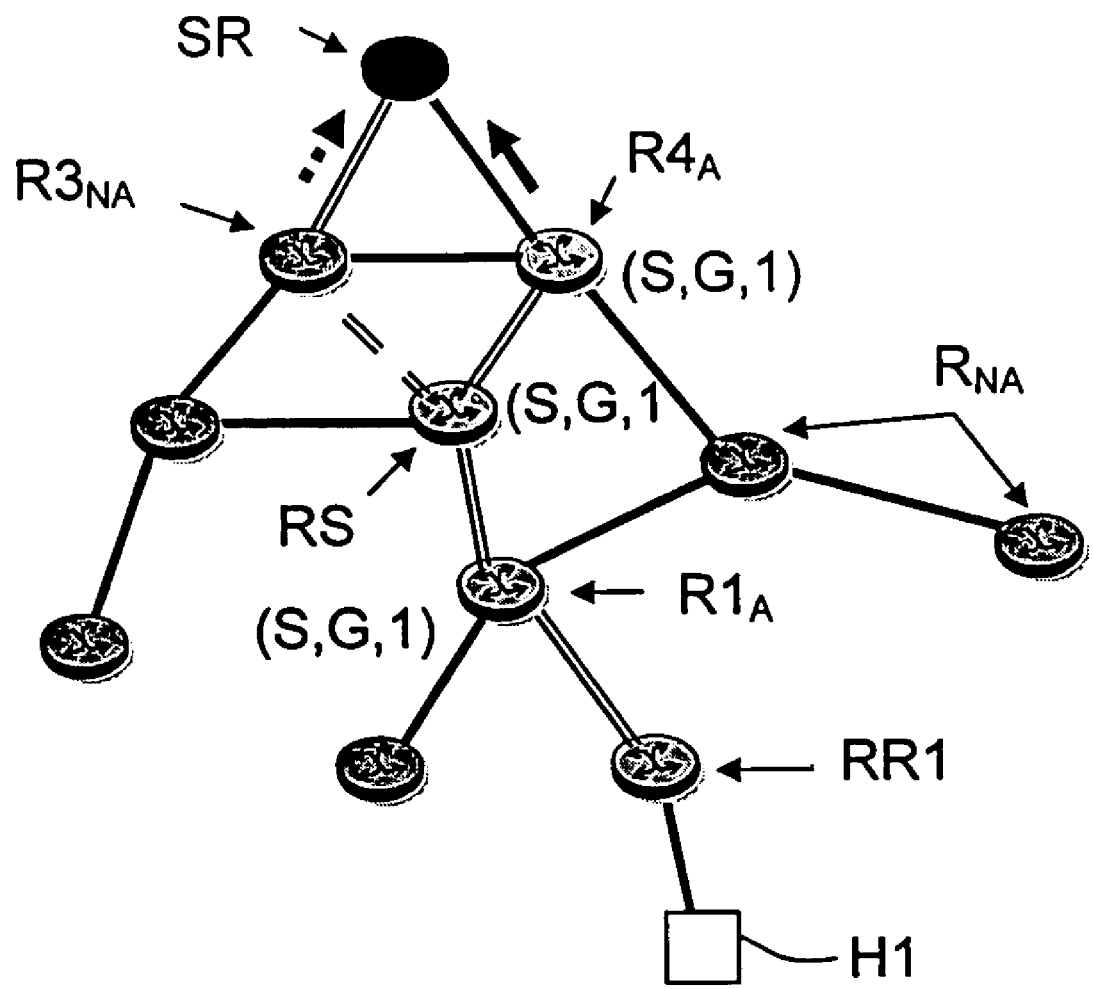

This transmission operation and the operations that follow are therefore the same as those previously described with reference to FIGS. 4A and 4B. Their objective is to recreate one or several links in the upper part of the hierarchical tree, located between the child router concerned and the source router SR.

It is also advantageous for a child router that detects an intensity below the second threshold T2 and above the first threshold T1, on a link with its parent router, to wait for a few moments before transmitting its tree joining request to another neighboring parent router. Indeed, the decrease in intensity on a link may be momentary, and for example result from a slight moving of the child or parent router.

In this case, the child router may launch a programmed timeout for a chosen duration, for example equal to 500 ms, once it detects an intensity below the second threshold T2 and above the first threshold T1. When the time elapsed is equal to the duration chosen, the child router transmits its join message to another neighboring parent router.

Of course, if the child router perceives, during its comparisons (which are continuous), that the intensity of the signal on the link being interrupted has risen above the second threshold T2, the timeout counting is stopped. The timeout then returns to the value zero (0). It may also be envisaged that the timeout does not return to the value 0 and is only stopped if the signal goes above the second threshold T2 for a time greater than a second duration D2, defined by another timeout. This decreases the sensitivity to the radioelectric environment and the various wave reflections.

The process according to the invention may be implemented by means of a processing device installed in each router, in the form of electronic circuits, software (or computer) modules, or a combination of circuits and software.

The invention is not limited to the hierarchical tree generation process embodiments described above, only by way of example; it encompasses all the variants that may be envisaged by experts within the framework of the claims below.

The invention claimed is:

1. A process for generating a "child/parent" hierarchical tree to carry out a point-to-multipoint routing in a Mobile Ad Hoc Network (MANET), wherein the process consists:, each time that a "child" router (RR, R) of said network wishes to join the hierarchical tree associated with a source router (SR), said child router sends a join message that associates said child router with a neighboring "parent" router (R) of said child router in the network, wherein said child router uses its knowledge of a network topology to determine said parent router as a neighboring router better placed than said child router on a routing path to the source router, said join message being transmitted by said child router to said neighboring parent router (R) in point-to-point mode, said join message denoting said source router (SR), and (a) If said neighboring parent router is already associated with another child router of said network, said requesting child router is associated with said neighboring parent router, in order to join it to said tree, and a value of a state information representative of a number of child routers associated with said neighboring parent router is incremented by one unit, (b) If said neighboring parent router is not already associated with another child router of said network, said requesting child router is associated with said neighboring parent router and said state information of said neighboring parent router is given the value "one", and said neighboring parent router transmits a join message designating said source router (SR) in point-to-point mode, to another neighboring router in said network, which in its turn constitutes a parent for said neighboring parent router, (c) Operation a) or operation b) is then repeated with said neighboring parent router receiving a join message according to whether or not it is already associated with another child router of said network.

2. A process according to claim 1, wherein: if said child router (RR, R) no longer wishes to belong to said tree, said child router transmits a prune message to its neighboring parent router in point-to-point mode.

3. A process according to claim 2, wherein:

i. if said neighboring parent router is associated with at least two child routers of said network, said requesting child router is disassociated from said neighboring parent router, so that it no longer belongs to said tree, and the value of said neighboring parent router's state information representative of the number of child routers associated with it is decremented by one unit, ii. if said neighboring parent router is only associated with said requesting child router, said requesting child router is disassociated from said neighboring parent router and said state information of said neighboring parent router is given the value zero, and transmitting a request for pruning from said tree by said neighboring parent router, to its own neighboring parent router, in point-to-point mode, iii. operation i) or operation ii) is then repeated with said neighboring parent router receiving a prune message according to whether it is associated with at least two child routers or with a single child router.

4. A process according to claim 1, wherein: if a link embodying an association between said parent router and said child router is interrupted, said child router transmits a join message designating said source router (RS), in point-to-point mode, to another neighboring router of said network, in order to be associated with it, and this neighboring router then becomes a new neighboring parent router for said child router.

5. A process according to claim 4, wherein:

I) if said neighboring parent router is already associated with another child router of said network, said requesting child router is associated with its new neighboring parent router, in order to join it to said tree, and the value of said new neighboring parent router's state information representative of the number of child routers associated with it is incremented by one unit, II) if said new neighboring parent router is not already associated with another child router of said network, said requesting child router is associated with said new neighboring parent router and said state information of said new neighboring parent router is given the value "one", and transmitting a join message designating said source router (SR) in point-to-point mode, by said new neighboring parent router, to another neighboring router of said network, which in its turn becomes a parent for said new neighboring parent router, III) operation I) or operation II) is then repeated with said neighboring parent router receiving a join message according to whether or not it is already associated with another child router of said network.

6. A process according to claim 4, wherein: if said link embodying an association between said parent router and said child router is interrupted, said parent router transmits a request for pruning from said tree to its neighboring parent router, in point-to-point mode.

7. A process according to claim 6, wherein: a time elapsed since start of said link interruption is counted by said parent router, so that said prune request is only transmitted once a first chosen duration has elapsed.

8. A process according to claim 1, wherein: at a level of each router of said tree an intensity of signals originating from its parent router is analyzed, then said intensities are compared with a chosen threshold, so that if an intensity below said threshold is detected by a child router on a link with its neighboring parent router, said child router transmits a request to join said tree to a neighboring router other than its neighboring parent router.

9. A process according to claim 8, wherein: a time elapsed since said signal intensity first fell below the threshold is counted by said child router, so that said join request is only transmitted once a second chosen duration has elapsed.

10. A process according to claim 1, wherein: said join message and/or a prune message includes a "unicast" address designating said source router and a "multicast" group address.

11. A process according to claim 1, wherein: said MANET point-to-multipoint proactive routing protocol is chosen from a group containing at least the Topology Based and dissemination with Reverse Path Forwarding (TBRPF) and Optimized Link State Routing (OLSR) protocols.

* * * * *

UNITED STATES PATENT AND TRADEMARK OFFICE
CERTIFICATE OF CORRECTION

PATENT NO. : 7,602,738 B2 Page 1 of 1
APPLICATION NO. : 11/126293
DATED : October 13, 2009
INVENTOR(S) : Christophe Preguica It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1143 days.

Signed and Sealed this

Fifth Day of October, 2010

David J. Kappos
*Director of the United States Patent and Trademark Office*